Patented Oct. 15, 1935

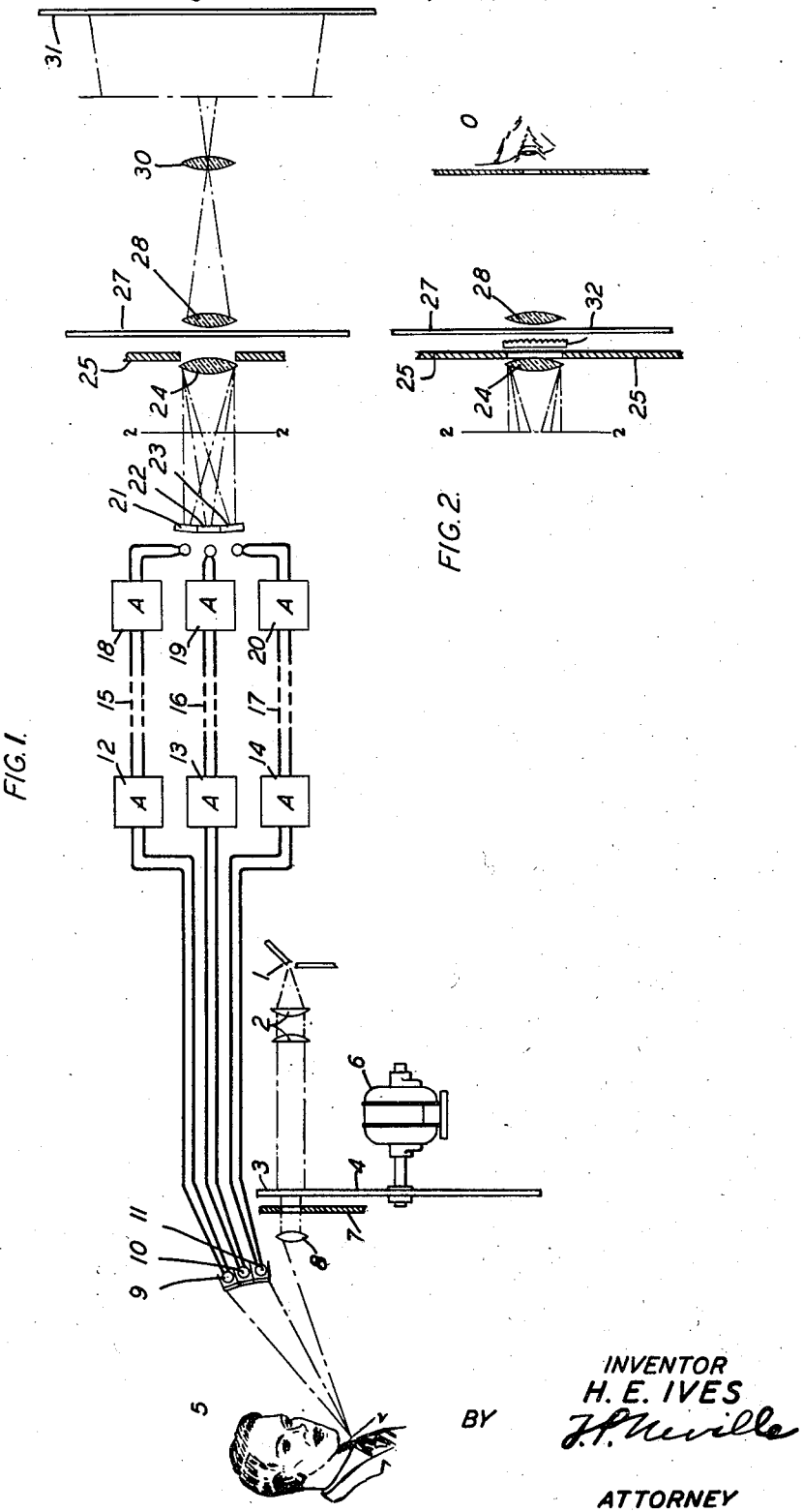

2,017,659

UNITED STATES PATENT OFFICE

2,017,659

ELECTROOPTICAL SYSTEM

Herbert E. Ives, Montclair, N. J., assignor to Bell Telephone Laboratories, Incorporated, New York, N. Y., a corporation of New York Application October 13, 1930, Serial No. 488,304
Renewed March 22, 1935

6 Claims. (Cl. 178—6)

The present invention relates to electro-optical systems and more particularly to the production of images in color.

This invention is directed to apparatus of the type employing a plurality of light sources, each supplying light radiations of different wave lengths or bands of wave lengths occupying, in part at least, different portions of the range of wave lengths to which the eye is sensitive, which sources are energized respectively by image currents separately produced, means whereby said light waves are superimposed to produce a composite light beam, and cyclically moving scanning means in the path of the composite beam to produce an image in color. A system of this general type is disclosed in U. S. Patent 2,007,651 of H. E. Ives,, issued July 9, 1935. The present invention may be considered an improvement upon or a substitute for the receiving system of this earlier disclosure.

An object of the invention is to provide novel means to control the superposition of the different colored light radiations.

In one embodiment of the invention use is made of an optical system for causing the superposition of the different colored light radiations in the production of the compositely colored image. A plurality of sources each supplying light rays of a different color are respectively energized by incoming image currents received over different channels from light sensitive devices each activated by light rays of corresponding color. Light radiations from the different sources are transmitted through a lens system, a moving scanning member having a spiral of apertures, and a large lens for projecting an image in color upon a screen.

The invention also contemplates the production of an image in color which may be directly viewed by an observer. This embodiment comprises an optical system including a section of material provided with a microscopic structure having a plurality of light deviating surfaces, which are small compared with the definition of the image to be produced, for superposing the different colored light radiations supplied by separate light sources to produce a compositely colored image.

A description of the invention follows and is illustrated in the attached drawing, in which Fig. 1 diagrammatically illustrates a system embodying the invention, and Fig. 2 shows an arrangement which may be substituted for that on the right of section line 2—2 in Fig. 1.

Light of constant intensity is supplied by the source 1 through the lens system 2 and apertures 3, arranged in a spiral in the disc 4, to produce a moving light beam adapted to scan successive elemental areas constituting parallel lines of the object or field of view 5.

The field of view is completely scanned during each revolution of the disc 4 which is driven by a motor 6 at such speed that scanning is effected within the period of persistence of vision.

Associated with the scanning disc is a mask 7 provided with an opening which determines the size of the field scanned. A lens 8 is used to gather the light radiations passing through the apertures and focus them upon the field of view.

Light reflected from the field of view 5 is supplied to light sensitive elements 9, 10 and 11, each comprising one or more cells, which are respectively selective of radiations in different portions of the spectrum. The cells may be of such character that they are inherently selective of different color bands, or this result may be accomplished by providing each cell with a suitable filter. The filter associated with one cell, or group thereof, may be selective of a band of wave lengths including red light, a second filter may select a band of radiations including green light, and the third may transmit a wave band including blue light.

The cells will be activated by the reflected light to cause the production of separate image currents which are respectively amplified by the devices 12, 13 and 14 and the amplified currents are transmitted over separate communicating channels 15, 16 and 17, herein shown by way of example as wire lines, to amplifiers 18, 19 and 20.

For a more complete disclosure of the operation of the transmitting apparatus described above, reference may be made to U. S. Patent 1,878,147 of H. E. Ives, issued Sept. 20, 1932.

After amplification in the device 18 the current incoming over the channel 15 will be supplied to control the source of light 21, having associated therewith a filter which transmits light corresponding in color to that selected by the cell 9; current transmitted over channel 16 will energize the source of light 22, which has associated therewith a filter for transmitting light of the color activating cell 10, and current transmitted over channel 17 will be supplied to the light source 23 which is provided with a filter adapted to pass light of the color selected by the cell 11.

Light supplied through the filters from the sources 21, 22 and 23 is gathered by the lens 24 and projected in parallel rays through an opening in the mask 25 and apertures in a disc 27.

Lens 28 cooperates with the lens 24 to image the sources 21, 22 and 23 upon the lens 30, whereby light of the different colors respectively supplied by the sources 21, 22 and 23 is superposed to produce a composite beam of light which varies in accordance with the color characteristics of the successive unit areas of the object or record scanned at the transmitter. Reasonably satisfactory results can be obtained by using a single lens 24 to image the sources 21, 22 and 23 upon the lens 30. In order that the three sources 21, 22 and 23 may be simultaneously imaged upon the lens 30, its dimensions should be large.

In accordance with common practice, the disc 27 is driven in exact phase and synchronism with the disc 4 of the transmitter. A suitable system for this purpose is disclosed in U. S. Patent 1,999,376 of H. M. Stoller, issued April 30, 1935.

Elements 21, 22 and 23 may comprise any suitable source adapted to supply light which varies with the changing amplitude of the incoming image currents. A suitable glow lamp for this purpose is disclosed in U. S. Patent 1,918,309 of H. W. Weinhart, issued July 8, 1933.

The gain of the respective amplifiers should be adjusted and the densities of the filters associated with sources 21, 22 and 23 should be chosen, so that a beam of good quality white light is projected upon the screen when a white elemental area is illuminated by the scanning beam at the transmitter.

Elemental areas having color characteristic will operate to produce image currents of such values in the respective channels that, when they are supplied to the sources 21, 22 and 23, the composite beam incident upon the screen 31 will correspond in color to the successive elemental areas of the field of view being scanned at the transmitter.

The scanning mechanism and optical system, including the lenses 24 and 28 operate to reproduce the successive elemental areas in color at the receiver, and the lens 30 cooperates therewith to project upon the screen 31 an image in color of the field of view scanned at the transmitter.

If it is desired to view the image directly, this may be accomplished by using the apparatus shown in Fig. 2 in place of the apparatus at the right of section line 2—2 in Fig. 1.

The optical system shown in Fig. 2 comprises the lens 24, a stationary element 32, provided with a microscopic structure consisting of a plurality of surfaces which bend or refract the light passing through it, and a lens 28. Associated with this system is a mask 25 which determines the size of the field to be scanned, and an apertured disc 27 for scanning the field of view.

Element 32 may consist of any light transmitting material provided with a surface which is lenticulated, ridged or carries prisms, the dimensions of which are small compared with the definition of the image to be produced. A suitable material for this purpose is the well known lenticulated celluloid sheet produced by the Kodacolor process.

An image in color may be seen by an observer stationed at O.

Other transmitters may be used with the receiver herein described. Typical examples of other transmitters, which may be employed, are disclosed in U. S. Patents of H. E. Ives, 1,874,191, issued Aug. 30, 1932, and 2,001,730, issued May 21, 1935.

What is claimed is:

1. Electro-optical apparatus for producing images in natural colors comprising a plurality of light sources energized by incoming image currents and respectively emitting light waves of different lengths within the range for which the eye is sensitive, and means acting upon said light waves to form superimposed images of said sources, comprising an optical system including a bank of light directing elements much greater in number than the number of light sources, said elements acting continuously on the light sources.

2. Electro-optical apparatus for producing images in natural colors comprising a plurality of light sources respectively emitting light waves of different lengths within the range for which the eye is sensitive and controlled by incoming image currents, and means acting upon said light waves to form superimposed images of said sources comprising an optical system including a bank of small cylindrical lenses.

3. Electro-optical apparatus for producing images in natural colors comprising a plurality of light sources energized by incoming image currents and respectively emitting light waves of different lengths within the range for which the eye is sensitive, and means acting upon said light waves to form superimposed images of said sources comprising an optical system including a transparent member having lenticulations much greater in number than the number of light sources, said lenticulations acting continuously on the light sources.

4. Electro-optical apparatus for producing images in natural colors comprising a plurality of light sources energized by incoming image currents and respectively emitting light of different wave lengths within the range for which the eye is sensitive, means acting upon said light waves to form superimposed images of said sources, comprising an optical system including a bank of light directing elements much greater in number than the number of light sources for superposing the light of different wave lengths, said elements acting continuously on the light sources and cyclically moving scanning means in the path of the light passing through said optical system.

5. Electro-optical apparatus for producing images in natural colors comprising a plurality of light sources energized by incoming image currents and respectively emitting light of different wave lengths within the range for which the eye is sensitive, means acting upon said light waves to for superimposed images of said sources, comprising an optical system including a member having lenticulations much greater in number than the number of the light sources, said lenticulations acting continuously on the light sources, and an apertured scanning disc for scanning the field defined by said member.

6. Electro-optical apparatus for producing images in natural colors comprising a plurality of light sources energized by incoming image currents and respectively emitting light of different wave lengths within the range for which the eye is sensitive, and means acting upon said light waves to form superimposed images of said sources, comprising an optical system including a stationary film provided with lenticulations much greater in number than the number of said light sources, said lenticulations acting continuously on the light sources.

HERBERT E. IVES.